US009537957B2

(12) United States Patent
Zawacki et al.

(10) Patent No.: US 9,537,957 B2
(45) Date of Patent: Jan. 3, 2017

(54) SEAMLESS APPLICATION SESSION RECONSTRUCTION BETWEEN DEVICES

(75) Inventors: Jennifer Greenwood Zawacki, Hillsboro, NC (US); Justin Tyler Dubs, Durham, NC (US); Howard Jeffrey Locker, Cary, NC (US); Julie Anne Morris, Raleigh, NC (US); Steven Richard Perrin, Raleigh, NC (US); Axel Ramirez Flores, Durham, NC (US); James Joseph Thrasher, Efland, NC (US); Sean Michael Ulrich, Morrisville, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 676 days.

(21) Appl. No.: 12/552,417

(22) Filed: Sep. 2, 2009

(65) Prior Publication Data

US 2011/0055627 A1     Mar. 3, 2011

(51) Int. Cl.
    *H04L 29/08*     (2006.01)
(52) U.S. Cl.
    CPC .............. *H04L 67/14* (2013.01); *H04L 67/148* (2013.01)
(58) Field of Classification Search
    CPC ............................... H04L 67/14; H04L 67/148
    USPC ........... 707/620, 602; 709/224, 227; 714/15, 714/E11.023
    See application file for complete search history.

(56) References Cited

U.S. PATENT DOCUMENTS

| 6,064,380 | A  | * | 5/2000  | Swenson et al. ............. 715/273 |
| 6,177,931 | B1 | * | 1/2001  | Alexander et al. ............. 725/52 |
| 7,143,353 | B2 | * | 11/2006 | McGee et al. ................ 715/723 |
| 7,886,327 | B2 | * | 2/2011  | Stevens ......................... 725/105 |
| 2002/0163532 | A1 | * | 11/2002 | Thomas et al. ............... 345/723 |
| 2003/0037035 | A1 | * | 2/2003  | Deguchi ........................... 707/1 |
| 2003/0074590 | A1 | * | 4/2003  | Fogle et al. .................. 713/320 |
| 2003/0195963 | A1 | * | 10/2003 | Song et al. ................... 709/227 |
| 2004/0068567 | A1 | * | 4/2004  | Moran et al. ................. 709/227 |

(Continued)

FOREIGN PATENT DOCUMENTS

| CN | 1446333 | 10/2003 |
| CN | 1470130 | 1/2004 |

(Continued)

OTHER PUBLICATIONS

Li, Francis C., et al., "Browsing Digital Video", CHI 2000, The Hague, Amsterdam, Apr. 1-6, 2000, pp. 169-176.*

*Primary Examiner* — Thu-Nguyet Le
(74) *Attorney, Agent, or Firm* — John L. Rogitz; John M. Rogitz

(57) ABSTRACT

A first device captures session data for each application session that is executing on a first device, and provides the session data to a second device in order for the second device to reconstruct the application sessions. A first device identifies one or more application sessions currently executing on the first device. Each of the application sessions include a media object and session data, which includes a media object identifier that corresponds to the media object and a first device media session position. The first device captures the session data transmits the captured session data to one or more second devices. The second devices are adapted to reconstruct at least one of the application sessions using the received session data and positions the application sessions at a second device media session position that corresponds to the received first device media session position.

24 Claims, 10 Drawing Sheets

(56) References Cited

U.S. PATENT DOCUMENTS

| | | | |
|---|---|---|---|
| 2004/0186993 A1* | 9/2004 | Risan et al. | 713/164 |
| 2005/0038794 A1* | 2/2005 | Piersol | 707/100 |
| 2005/0066037 A1* | 3/2005 | Song et al. | 709/227 |
| 2005/0097618 A1* | 5/2005 | Arling et al. | 725/114 |
| 2005/0289236 A1* | 12/2005 | Hull et al. | 709/231 |
| 2006/0168510 A1* | 7/2006 | Bryar et al. | 715/511 |
| 2006/0293991 A1* | 12/2006 | Jenzowsky et al. | 705/35 |
| 2007/0118849 A1* | 5/2007 | Kisel et al. | 725/25 |
| 2007/0266410 A1* | 11/2007 | Balfanz et al. | 725/88 |
| 2008/0059989 A1* | 3/2008 | O'Connor et al. | 725/9 |
| 2008/0168359 A1* | 7/2008 | Flick et al. | 715/748 |
| 2008/0235401 A1* | 9/2008 | Lam et al. | 709/246 |
| 2009/0049118 A1* | 2/2009 | Stevens | 709/203 |
| 2009/0183622 A1* | 7/2009 | Parash | 84/610 |
| 2009/0241149 A1* | 9/2009 | Yoshioka et al. | 725/87 |
| 2010/0027966 A1* | 2/2010 | Harrang et al. | 386/69 |
| 2010/0042642 A1* | 2/2010 | Shahraray et al. | 707/102 |
| 2010/0082136 A1* | 4/2010 | Rosenblatt et al. | 700/94 |
| 2010/0122277 A1* | 5/2010 | Fonseca | 725/10 |
| 2010/0154012 A1* | 6/2010 | Clavenna et al. | 725/109 |

FOREIGN PATENT DOCUMENTS

| | | | | |
|---|---|---|---|---|
| CN | 1492668 | | 4/2004 | |
| CN | 1612599 | | 5/2005 | |
| CN | 1668104 | | 9/2005 | |
| CN | 1684423 | | 10/2005 | |
| CN | 1902865 | | 1/2007 | |
| CN | 1984413 | | 6/2007 | |
| CN | 101009578 | | 8/2007 | |
| CN | 101030154 | | 9/2007 | |
| CN | 101406058 | | 4/2009 | |
| CN | 101517554 | | 8/2009 | |
| WO | WO 00/04726 | * | 1/2000 | H04N 5/00 |
| WO | 2008035603 | | 3/2008 | |

* cited by examiner

SEAMLESS APPLICATION SESSION RECONSTRUCTION BETWEEN DEVICES

BACKGROUND OF THE INVENTION

1. Technical Field

The present invention relates to a method for seamlessly reconstructing application sessions originating on a first electronic device onto a second electronic device. More particularly, the present invention relates to capturing application session data on a first device, which includes a first device media session position, and seamlessly reconstructing the application session on a second device by positioning the reconstructed application sessions at a second device media session position that corresponds to the received first device media session position.

2. Description of the Related Art

Users typically utilize multiple electronic devices for performing tasks, such as a desktop computer, a laptop computer, a mobile phone, an audio player, and etcetera. These electronic devices typically perform functions, or application sessions, similar to each other. For example, each of the electronic devices listed above may be capable of playing an audio file and some of electronic devices may be capable of playing a video file.

Users typically select a particular electronic device to utilize based upon their surroundings. For example, a user may utilize a desktop computer at an office, utilize a mobile phone on a bus, and utilize a laptop computer at an airport. When users switch between a first device and a second device, the user is required to perform actions on the second device that the user already performed on the first device in order bring application sessions on the second device to the same point as they were on the first device. For example, a user may be viewing a web page on the first device and in order to view the same web page on the second device, the user is required to re-enter the web page address. In another example, a user may be watching a video on the first device and, in order to start watching the video on the second device at the same position on the second device, the user is required to fast forward through the video to the appropriate position.

SUMMARY

A first device captures session data for each application session that is executing on a first device, and provides the session data to a second device in order for the second device to reconstruct the application sessions. The first device commences session data capture by identifying one or more application sessions currently executing on the first device. Each of the application sessions includes a media object and session data. The session data includes a media object identifier (e.g., a file name, URL, etc.) that corresponds to the media object and a first device media session position (e.g., scroll position, playback position, cursor position, etc.). The first device captures the session data and transmits the captured session data to one or more second devices. The second devices are adapted to reconstruct at least one of the application sessions using the received session data. During the reconstruction, a second device positions the application session at a second device media session position that corresponds to the received first device media session position. The second devices also have the capability, similar to the first device, to capture session data and provide the session data to the first device, which the first device reconstructs accordingly.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
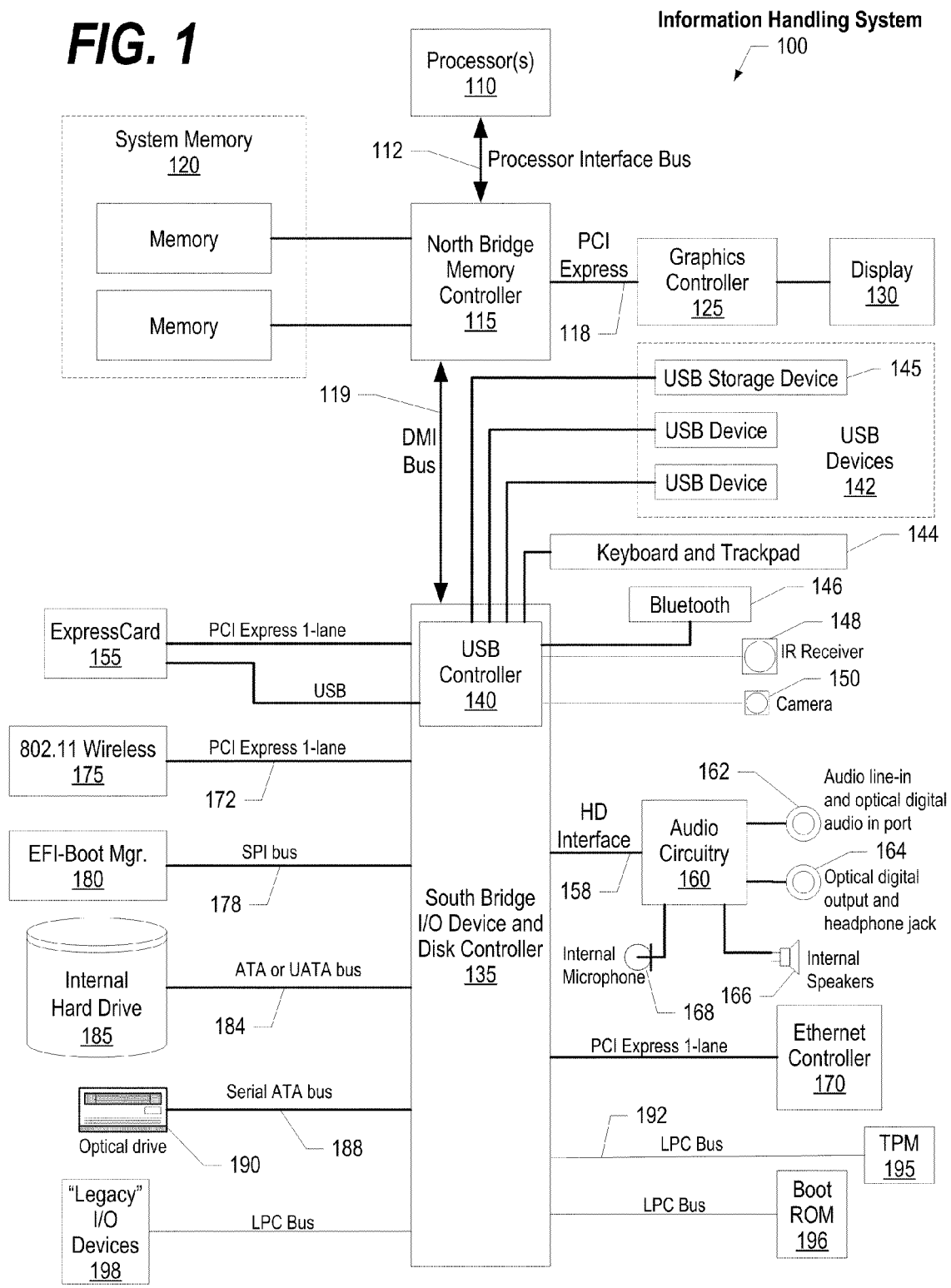
FIG. 1 is a block diagram of a data processing system in which the methods described herein can be implemented.
Figure 2:
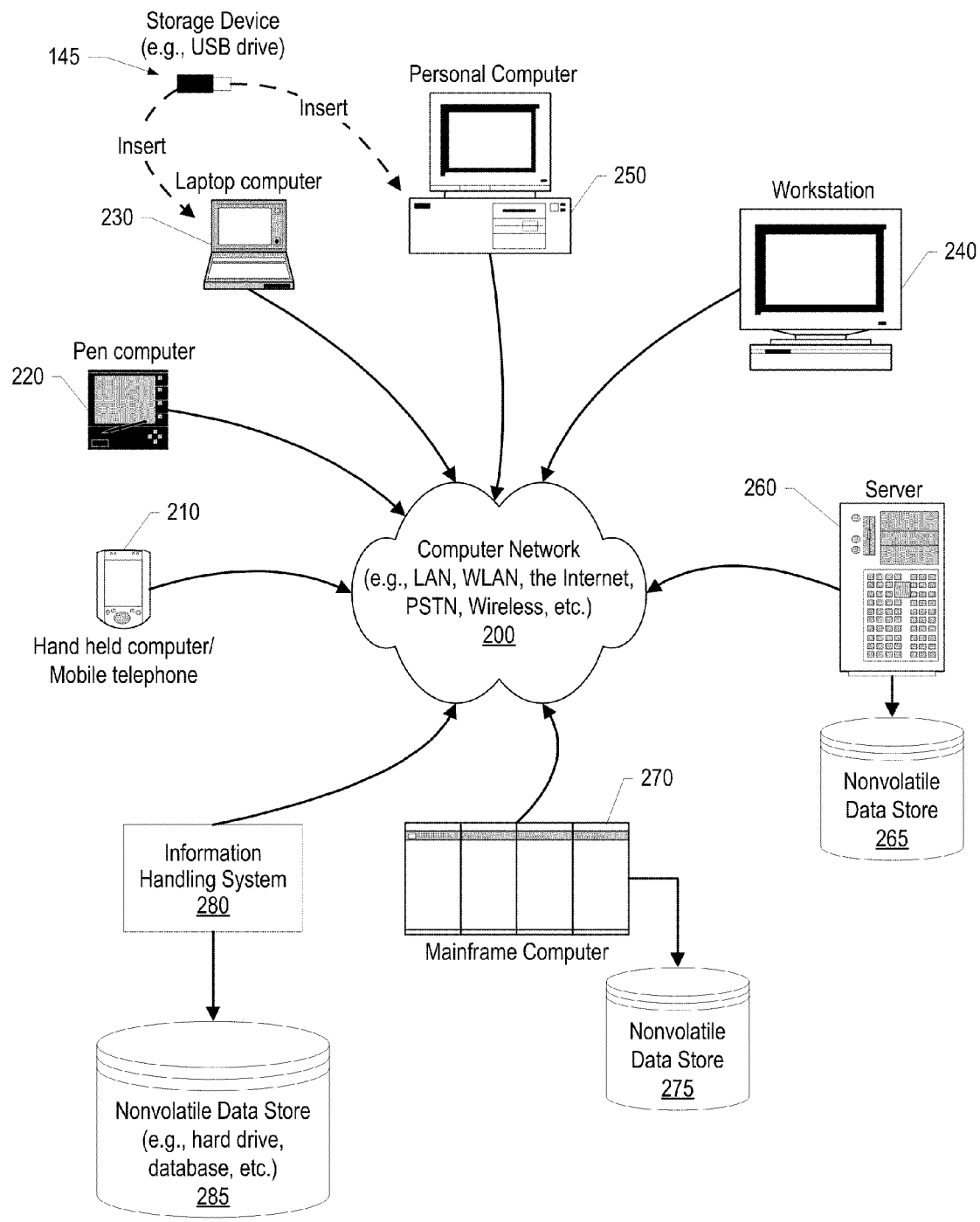
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). An external device can wirelessly connect to Bluetooth device 146 and transmit data to the information handling system, in which case Bluetooth device 146 acts as a data receiver for the information handling system. USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera. When an external device is connected to USB controller 140 that is capable of receiving data from the information handling system, the USB controller acts as a data receiver.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks. When an external device connects to the information handling system using wireless LAN device 175 or wired LAN via a connection to Ethernet controller 170, and when the external device sends data to the information handling system, the LAN device 175 performs the role of a data receiver. Indeed, any device that can route or transmit data to the information handling system via a component of the information handling system acts as an external device and the component that receives such data acts as a data receiver of the information handling system.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
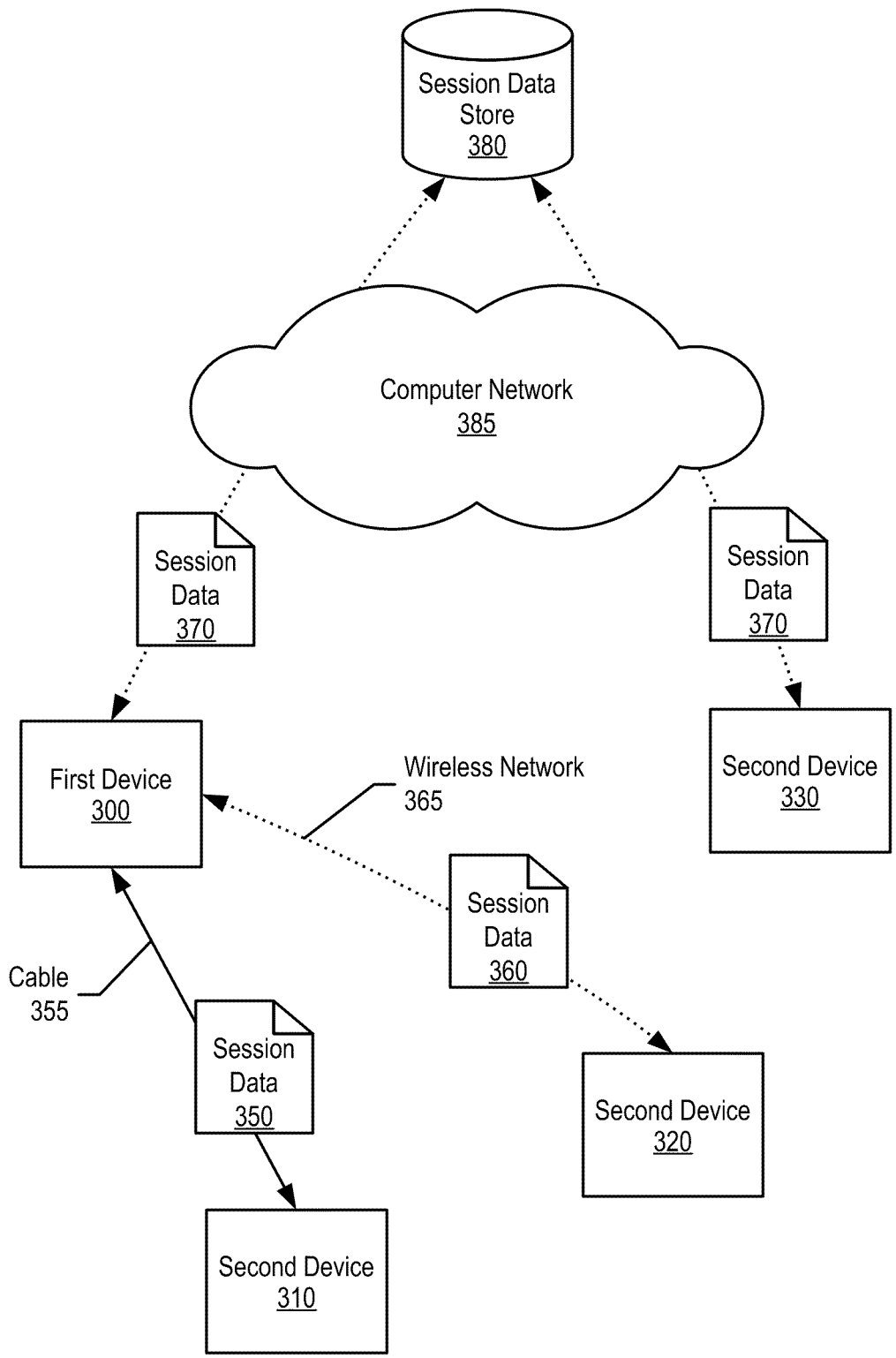
FIG. 3 is an exemplary diagram showing a first device exchanging session data between one or more second devices through various communication means.

FIG. 3 is an exemplary diagram showing a first device exchanging session data between one or more second devices through various communication means. FIG. 3 includes four devices, which are first device 300 and second devices 310-330. First device 300 and second devices 310-330 are electronic devices such as, for example, a desktop computer, a laptop computer, a netbook computer (Internet accessible device), a mobile phone, an audio player, a video player, etcetera. As one skilled in the art can appreciate, more or less devices may be used for exchanging session data than what is shown in FIG. 3.

A user utilizes first device 300, for example, to view a web page, listen to music, and type a document. Each of these actions corresponds to an application session that is executing on first device 300. First device 300 may be executing multiple application sessions using multiple applications. For example, the user may be listening to music on first device 300 while pasting information from a web page into a document. In one embodiment, the user may wish to continue the application sessions but is not able to continue working on first device 300. For example, the user may be in an office using a desktop computer (first device 300) and may need to go to the airport. In this example, the user may wish to continue the application sessions on a laptop computer or mobile phone (e.g., second device 310).

First device 300 captures session data for each application based upon an event such as a manual request, system trigger events, application trigger events, or network trigger events. A manual request corresponds to the user requesting first device 300 to capture session data, such as through a user interface window. System trigger events, for example, are events such as first device 300 entering hibernation mode, suspend mode, low battery mode, detecting a percentage of data changed, a time interval, and pre-defined scheduled times. Network trigger events may be events such as a second device entering a wireless network (wireless network 365), a cable plugged in and coupled to a second device (cable 355), a network cable plugged in, and etcetera. Application trigger events may be events such as when an application saves data.

For each application session, first device 300 captures a media object identifier and a first device media session position. The media object identifier, for example, may be a document file name, a web page URL, or an audio file name. The first device media position may include a scroll position, a cursor position, or a playback position. For example, a user may be listening to a song that has been playing for two minutes and, in this example, the playback position would be "2:00." In another example, a user may be viewing a large document at a particular location (e.g., halfway down page 65) and, in this example, the scroll position would reflect the user's viewing position. In addition, based upon the application session, first device 300 may capture other session data such as user-entered text, history, cookies, etcetera (see FIG. 8 and corresponding text for further details).

In one embodiment, first device 300 may capture session data only for application sessions in which a corresponding second device may reproduce. For example, if first device 300 is capturing data to send to second device 310, which may be an audio player, first device 300 may capture only audio type application session data (see FIG. 8 and corresponding text for further details).

Once first device 300 has captured the session data, first device 300 sends the session data to appropriate second devices 310-330. For example, first device 300 may send session data 360 to second device 320 over wireless network 365. In one embodiment, first device 300 may send session data to multiple second devices, such as sending word processing and spreadsheet session data 350 to second device 310 (e.g., laptop computer) over cable 355, and also sending audio session data 360 to second device 320 (e.g. audio player) over wireless network 365. In yet another embodiment, first device 300 may store session data 370 on computer network 385 (e.g., distributed network) in session data store 380 for later retrieval by second device 330. For example, the user may wish to save session data 370 in session data store 380 and, when the user arrives at an airport, retrieve session data 370 using second device 330.

When a second device receives session data, the second device uses the session data to reconstruct the application session similar to the application session's state on first device 300. For example, second device 310 may receive session data for an audio application session, a web page application session, and a word processing application session. In this embodiment, second device 310 reconstructs each of the application sessions and positions each application session (e.g., playback position, scroll position, cursor position, etcetera) according to the first device media position information included in the session data. In one embodiment, first device 300 may flag one of the application sessions as an "active window," in which case the second device specifies the corresponding reconstructed application session as the active window on the second device (see FIG. 10 and corresponding text for further details). As one skilled in the art can appreciate, second devices 310-330 may also capture and send session data to first device 300, such as when second device 320 enters wireless network 365.

Figure 4:
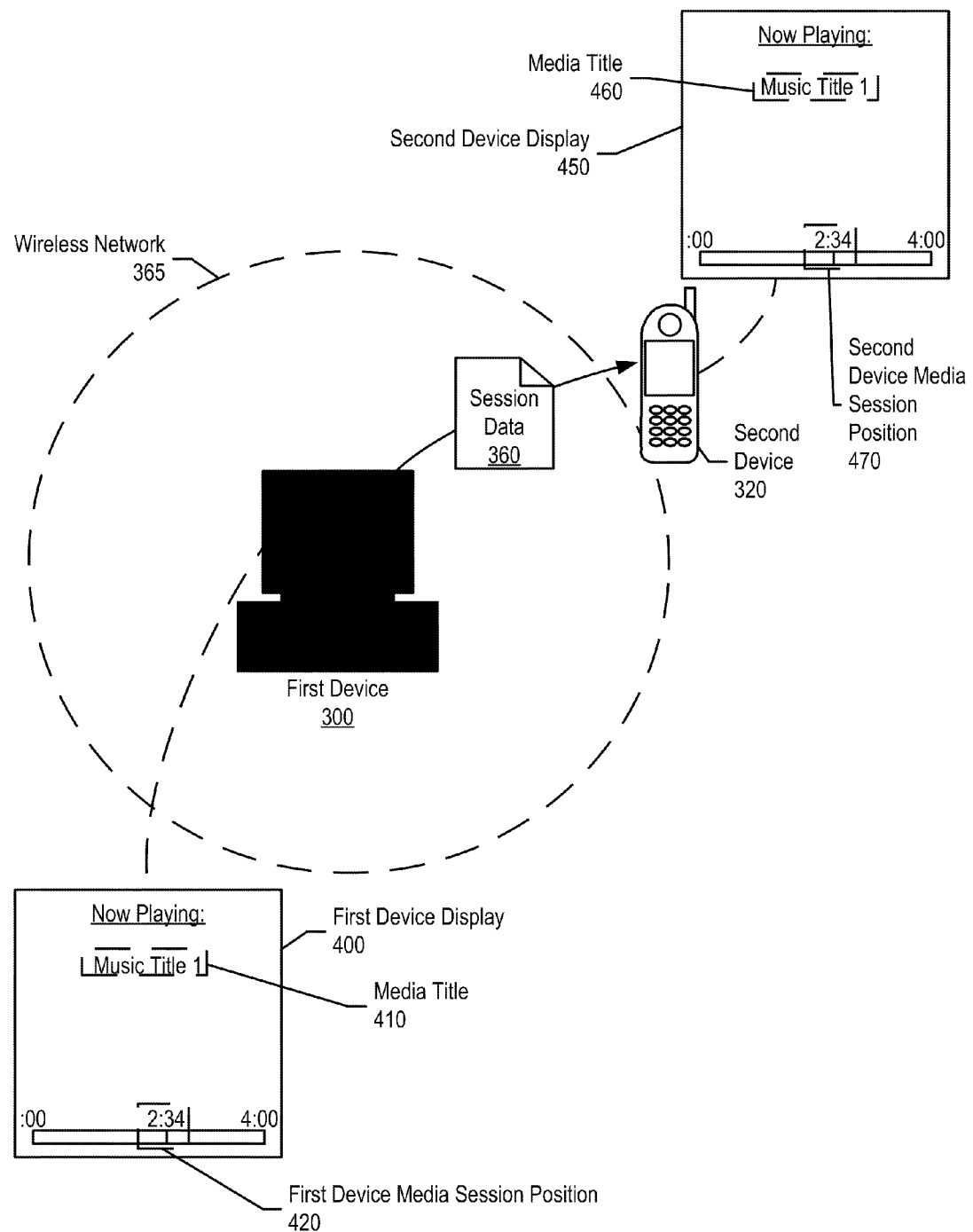
FIG. 4 is for is a diagram showing a first device providing session data to a second device that allows the second device to commence playing an audio file at a second device media session position corresponding to a playback position on the first device.

FIG. 4 is for is a diagram showing a first device providing session data to a second device that allows the second device to commence playing an audio file at a second device media session position corresponding to a playback position on the first device.

First device 300 includes first device display 400, which shows an application session playing a song (media title 410). First device display 400 shows that the song has been playing for "2:34" (first device media session position 420). First device 300 captures session data that includes a media object identifier (a file name corresponding to media title 410) and first device media session position 420. First device 300 then sends session data 360 to second device 320 over wireless network 365.

In turn, second device 320 reconstructs the application session on second device display 450. As can be seen, second device 320 begins playing the same song (media title 460) at the same position within the song (second device media session position 470). As one skilled in the art can appreciate, second device 320 may also capture and send session data to first device 300, such as when second device 320 enters wireless network 365.

Figure 5:
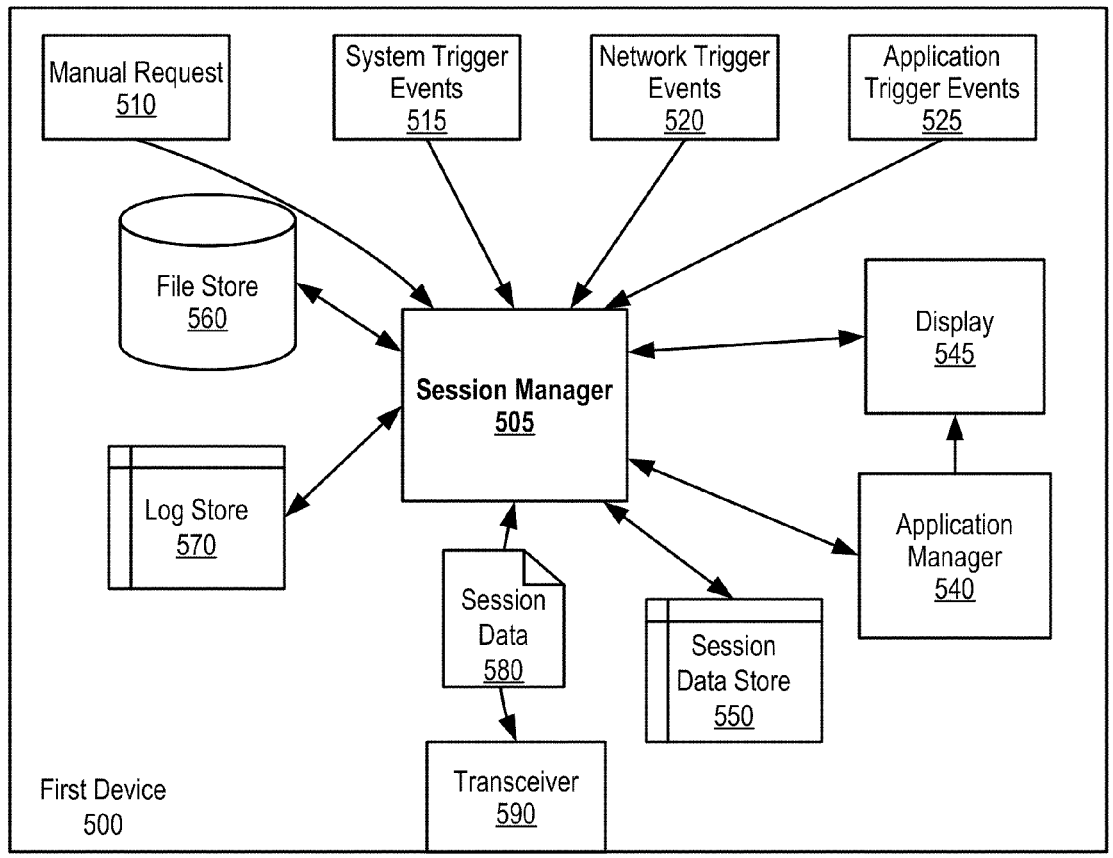
FIG. 5 is an exemplary diagram showing various hardware and software components included in a device for utilizing an embodiment of the invention described herein.

FIG. 5 is an exemplary diagram showing various hardware and software components included in a device for utilizing an embodiment of the invention described herein. First device 500 (stationary device or mobile device) includes session manager 505, which monitors application sessions and captures session data to provide to a second device. As one skilled in the art can appreciate, the second device may have components similar to those shown in FIG. 5 in order to reconstruct application sessions as well as capturing subsequent application session data to provide to the first device.

First device 500 monitors manual request 500, system event triggers 515, network trigger events 520, and application trigger events 525 for indications as to when to capture session data. Manual request 500 may be a user manually initiating a session data capture request through a user interface window. System trigger events 515 may be events such as the device entering hibernation mode, suspend mode, low battery detection, a percent of data changed, a time interval, scheduling, etcetera. Network trigger events 520 may be events such as a device in range of a wireless network, a cable plugged in to the second device, a network cable plugged in, and etcetera. And, application trigger events 525 may be events such as when a user saves data, when an application automatically saves data, or when an application detects a change in the session data.

File store 560 may include files for session manager 505 to access, such as document files, audio files, video files, and etcetera. Log store 570 includes entries that specify capabilities of other devices. For example, session manager 505 may determine to capture application-specific session data that a second device supports. For example, the second device may have limited applications installed, such as an audio file player, and, in this example, session manager 505 may determine to capture only session data that the second device is able to execute. In one embodiment, a user may configure session manager 505 to capture only application-specific session data in order to minimize the amount of session data that is sent to the second device. In another embodiment, session manager 505 may access an entry in log store 570 to identify the second device's supported applications and automatically determine to capture only application-specific session data that the second device supports as specified in the log entry.

Application manager 540 invokes applications and manages application sessions. A single application may have multiple application sessions executing, such as a word processing application having multiple documents open. Display 545 displays the application sessions to the user. Display 545 may be integrated into first device 500 (e.g., a cell phone display) or external to first device 500 (an external computer monitor).

Figure 8:
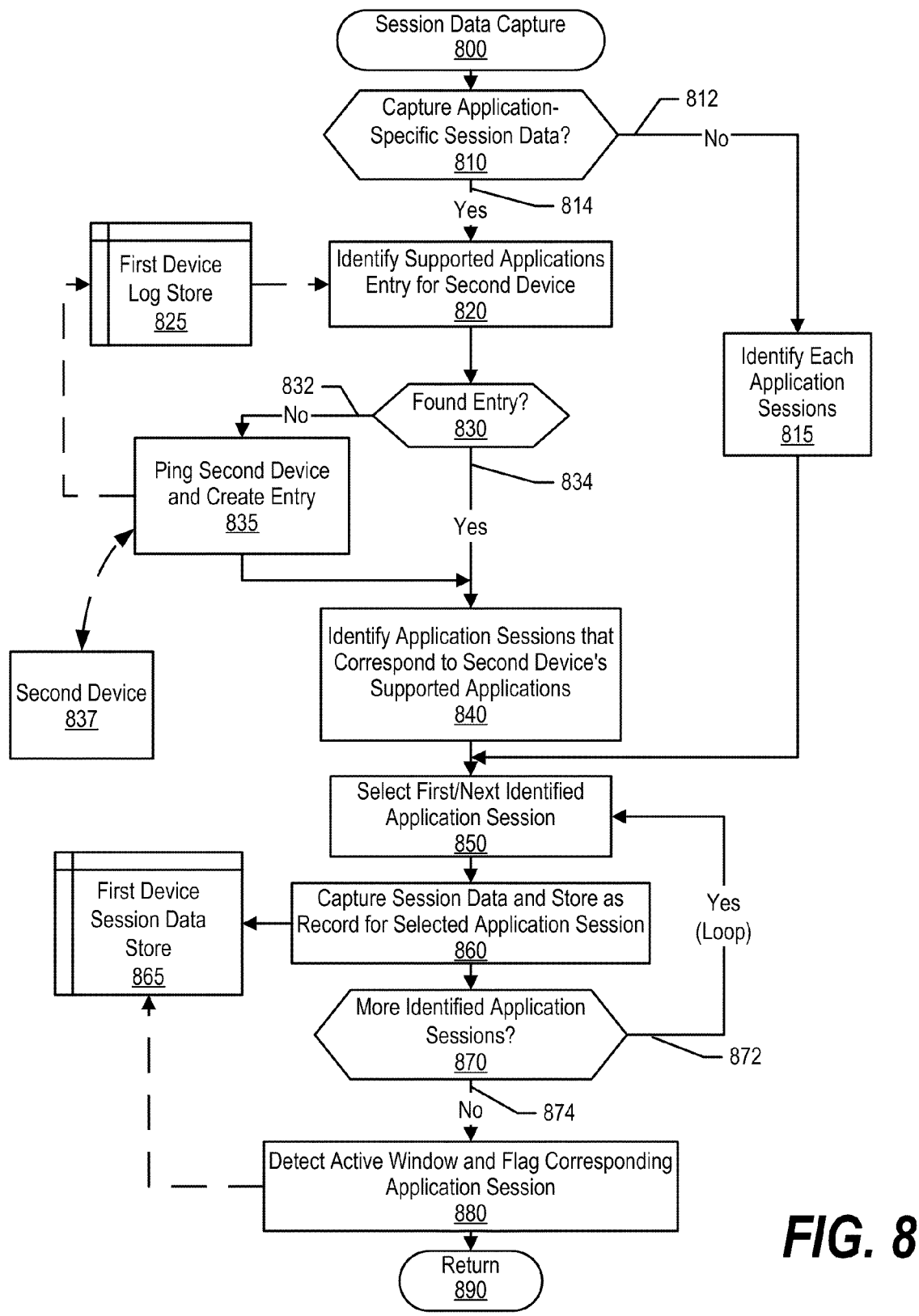
FIG. 8 is a flowchart showing steps taken in capturing session data at a first device.

Session manager 505 captures session data for the application sessions and stores the session data in session data store 550 (see FIG. 8 and corresponding text for further details). Session manager 505 may individually store session data for each application as a session data record. For example, session manager 505 may store in a session data record, for an audio application session, a song title (media object identifier), a playback position (first device media session position), and may also store the song (media object).

Once session manager 505 stores session data for each application session, session manager 505 provides session data 580 to a second device through transceiver 590, which may be a wired transmitter, a wireless transmitter, an optical transmitter, and etcetera.

In the reverse direction, when first device 500 receives session data from a second device, session manager 505 receives session data and stores it in session data store 580. In turn, session manager evaluates the session data and reconstructs the application sessions accordingly (see FIGS. 9,10, and corresponding text for further details).

Figure 6:
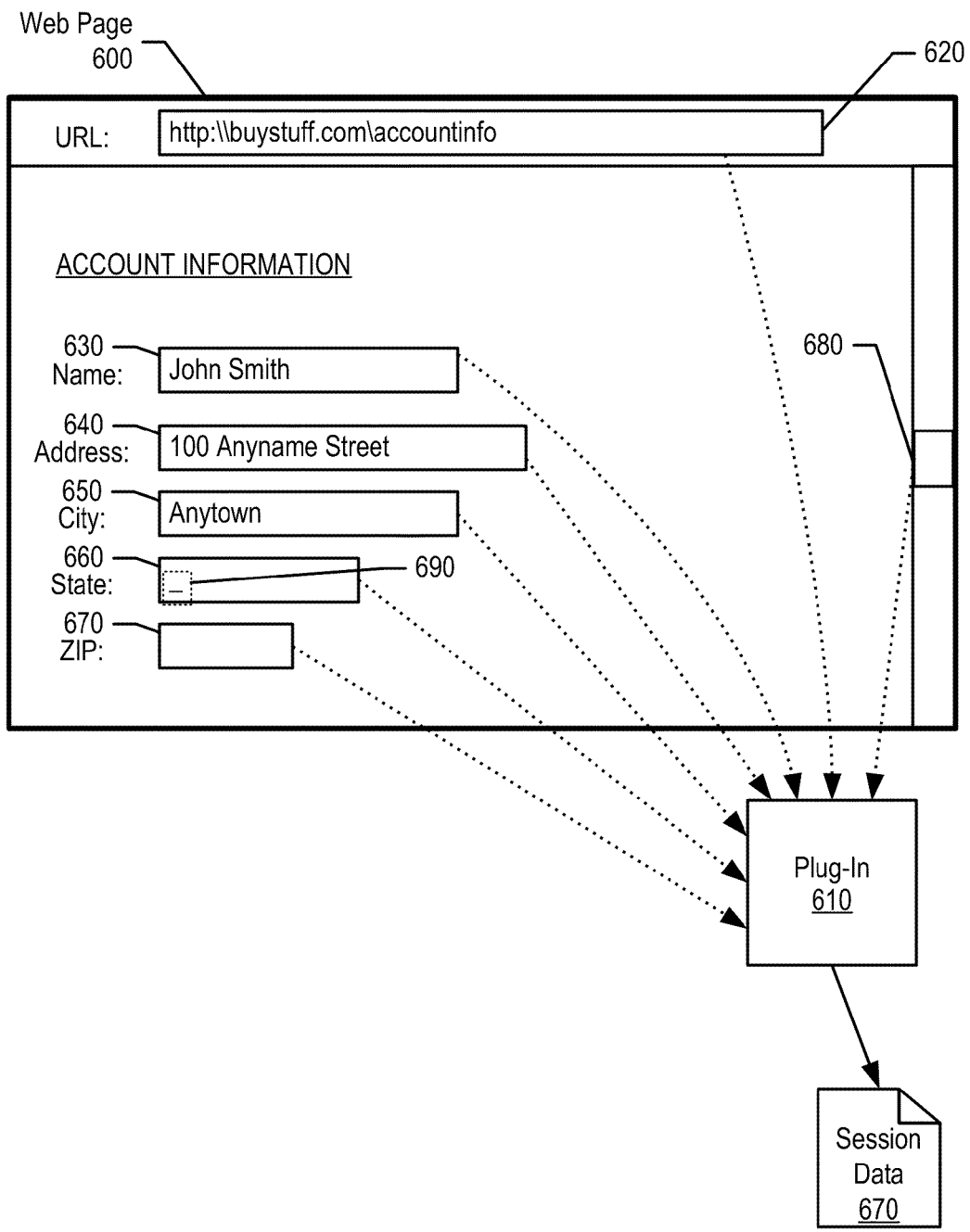
FIG. 6 is a diagram showing a plug-in capturing session data for a page of data that includes a media session position.

FIG. 6 is a diagram showing a plug-in capturing session data for a page of data that includes a media session position. Using the example shown in FIG. 6, a user may be using a mobile device to enter text on a form included in web page 600. In this example, in the middle of entering the data, the user enters his office and wishes to finish entering text using his desktop computer. As such, the user may invoke the mobile device to capture session data and send the session data to the user's desktop computer.

In one embodiment, a mobile device may enter a wireless network (e.g., Bluetooth) and, in turn, automatically capture session data and provide the session data to a second device.

In one embodiment, plug-in 610 is responsible for capturing session data for web page 600's application session. As such, plug-in 610 extracts the URL from field 620, which is the media object identifier, and also extracts user-entered data from fields 630-670. Finally, plug-in 610 identifies and stores media object position information such as cursor location 690 and scroll position 680.

In turn, plug-in 610 provides the captured session data 670 to a second device (e.g., the user's mobile device), which allows the second device to reconstruct web page 600 by populating the user-entered data in the appropriate fields, positioning web page based upon scroll position 680, and placing the cursor at cursor position 690.

In one embodiment, a device may use screen scraping to capture session data. In this embodiment, the device takes a screen shot of the image of an active window and then parses the image for recognizable text and/or images.

Figure 7:
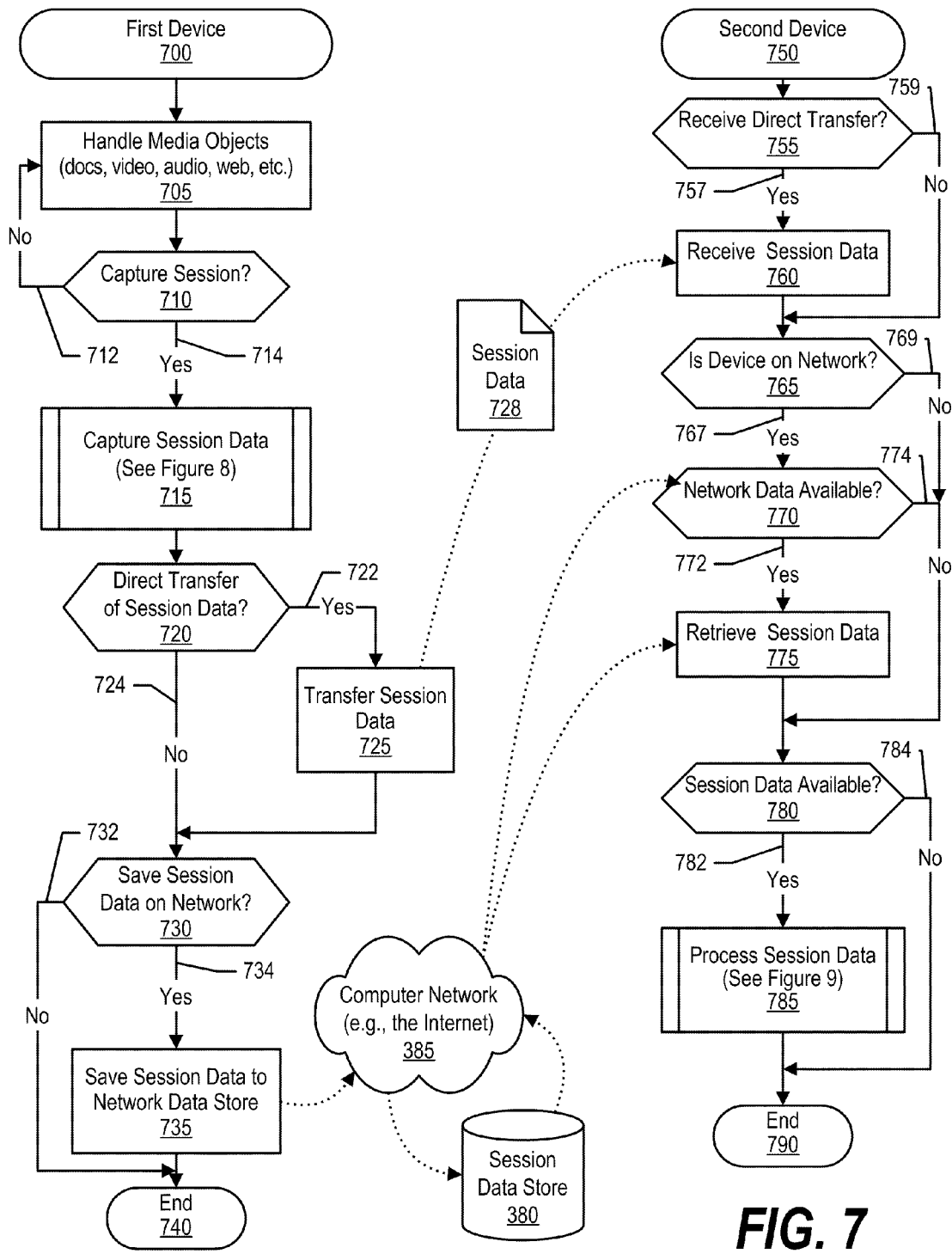
FIG. 7 is a high-level flowchart showing steps taken in providing session data from a first device to a second device.

FIG. 7 is a high-level flowchart showing steps taken in providing session data from a first device to a second device. For example, a user may need to leave an office wish to transfer active application session information (session data) from his desktop computer to his laptop computer In this example, the user may be listening to a song while entering data onto a web page form, and, in this example, the user may wish to transfer the web page location, the user-entered data, the song, and the current playback position of the song (e.g., two minutes into the song) to the user's laptop computer. In turn, the user's laptop computer is able to reconstruct the web page with the user-entered data and commence playing the song at the same playback position.

First device processing commences at 700, whereupon the first device handles media objects such as documents, video files, audio files, web pages, and etcetera (step 705). For example, the first device may be executing various application sessions, some of which may be using a single application (e.g., multiple word processing documents) and other application sessions using different applications (spreadsheet files, audio files, etcetera).

The first device determines whether to capture session data (decision 710). For example, the first device may detect entering a second device's personal area network, such as a wireless network, which triggers the first device to capture session data. In another example, a user may manually request that the first device capture session data, for example, through a user interface window. If the first device should not capture session data, decision 710 branches to "No" branch 712, which loops back to continue to handle media objects. This looping continues until the first device should capture session data, at which point decision 710 branches to "Yes" branch 714. In one embodiment, the first device is capturing data on a recurring basis, such as every minute or whenever the first device detects a change in the session data.

The first device proceeds through a series of steps to capture session data for application sessions that are currently executing on the first device, each of which may be stored as session data records (pre-defined process block 715, see FIG. 8 and corresponding text for further details). Once the first device captures the session data, the first device determines whether to directly transfer the session data to the second device, such as through a wireless connection to the second device or a cable coupled from the first device to the second device (decision 720). If the first device should directly transfer the session data to the second device, decision 720 branches to "Yes" branch 722, whereupon the first device transfers session data 728 to the second device at step 725. On the other hand, if the first device should not directly transfer the session data to the second device, decision 720 branches to "No" branch 724, bypassing step 725.

The first device determines whether to save the session data on a network, such as a distributed network (decision 730). For example, a user may request the first device to capture session data and store the session data on a network in order to retrieve the session data at a later time, such as at an airport. If the first device should save the session data on a network, decision 730 branches to "Yes" branch 734, whereupon processing saves the session data in session data 380 on computer network 385 (step 735). On the other hand, if the first device should not save the session data on a network, decision 730 branches to "No" branch 732, bypassing step 735. First device processing ends at 740.

Second device processing commences at 750, whereupon the second device determines whether it is requested to receive a direct transfer of session data from the first device (decision 755). For example, the second device may connect to the first device through a cable, which informs the second device to prepare to receive session data from the first device. If the second device should receive a direct transfer of session data, decision 755 branches to "Yes" branch 757, whereupon the second device receives session data 728 at step 760. On the other hand, if the second device is not informed to receive a direct transfer of session data, decision 755 branches to "No" branch 759, bypassing step 760.

The second device determines whether the second device is connected to a network, such as a local area network (LAN) (decision 765). If the second device is not connected to a network, decision 765 branches to "No" branch 769, bypassing session data retrieval steps through a network. On the other hand, if the second device is on a network, decision 765 branches to "Yes" branch whereupon a determination is made as to whether session data is available on the network (decision 770). For example a user may have stored session data on a network with the intention of retrieving the session data at a later time and different location. If session data is not available on the network, decision 770 branches to "No" branch 774, bypassing session data retrieval steps through a network. On the other hand, if session data is available on the network, decision 770 branches to "Yes" branch 772 whereupon the second device retrieves the session data from session data store 380 through computer network 385 (step 775).

The second device determines whether session data has been received directly or through a network (decision 780). If the second device has received session data, decision 780 branches to "Yes" branch 782 whereupon processing uses the session data to reconstruct application sessions onto the second device. As part of the reconstruction process, the second device uses first device media session positions, which are included in the session data, to reconstruct the application sessions at corresponding second device media session positions, such as a particular scroll position, playback position, or cursor position (pre-defined process block, see FIG. 9 and corresponding text for further details). Second device processing ends at 790.

FIG. 8 is a flowchart showing steps taken in capturing session data at a first device. Processing commences at 800, whereupon a determination is made as to whether to capture application-specific session data for the second device (decision 810). For example, the second device may have limited applications installed, such as an audio file player, and, in this example, processing may determine to capture only session data that the second device is able to execute, such as audio application sessions. In one embodiment, a user may configure the first device to capture only application-specific session data in order to minimize the amount of session data that is sent to the second device. In another embodiment, the first device may detect the second device's supported applications and automatically determine to capture only application-specific session data that the second device supports. In yet another embodiment, the first device may provide all available session data to the second device and, in this embodiment, the second device reconstructs only the application-specific session data that the second device supports.

If processing should capture session data for each application session currently executing, decision 810 branches to "No" branch 812 whereupon processing identifies each currently executing application session. On the other hand, if processing should capture application-specific session data, decision 810 branches to "Yes" branch 814 whereupon processing looks in first device log store 825 to locate an entry for the second device and identify the second device's supported applications, such as an audio player application, video player application, etcetera.

A determination is made as to whether processing found an entry in first device log store 825 that corresponds to the second device (decision 830). If processing did not find an entry for the second device, decision 830 branches to "No" branch 832 whereupon the first device pings second device 837 and receives information pertaining to second device 837's supported applications, which are stored in first device log store 825. On the other hand, if processing located an entry for the second device in first device log store 825, decision 830 branches to "Yes" branch 834, bypassing step 835. At step 840, processing identifies application sessions that correspond to the second device's supported applications, such as audio application sessions.

Once each application session is identified (step 815) or application-specific application sessions are identified (step 840), processing, at step 850, selects the first identified application session. At step 860, processing captures session data for the selected application session and stores the session data as a session data record in first device session data store 865. The session data includes a media object identifier and a media session position. The media object identifier identifies the media object in the application session, such as a file name, or URL. The media session position identifies a particular position within the media object, such as a playback position or scroll location.

In one exemplary embodiment that the media object is a web page, processing may capture a URL (media object identifier), scroll position (X and Y), cursor position, history, relevant plug-in data, cookies, temporary files, passwords, form data, and playback position (if an audio/file is playing within the web page).

In another exemplary embodiment that the media object is a media file, such as an audio file or video file, processing may capture session data such as the file name (media object identifier), playback position, and the file.

In another exemplary embodiment that the media object is a document, processing may capture session data such a file name, cursor position, the file, scroll position, recently opened files (history), and changes to the file since it was last saved.

Once the session data is captured for the first application session, a determination is made as to whether there are any more identified application sessions (decision 870). If there are more identified application sessions, decision 870 branches to "Yes" branch 872, which loops back to select the next identified application session and capture session data. This looping continues until there are no more identified application sessions in which to capture session data, at which point decision 870 branches to "No" branch 874.

At step 880, processing detects one of the application sessions that corresponds to an active user interface window. As those skilled in the art will appreciate, an active user interface window is a currently focused window in a window manager. Different window managers indicate the active window in different ways and allow the user to switch between windows in different ways. For example, in a window-based user environment, clicking on a particular window will cause that window to become active. The active user interface window is the window to which keys typed on the keyboard are sent, which may be visually obscured by other windows. Processing returns at 890.

Figure 9:
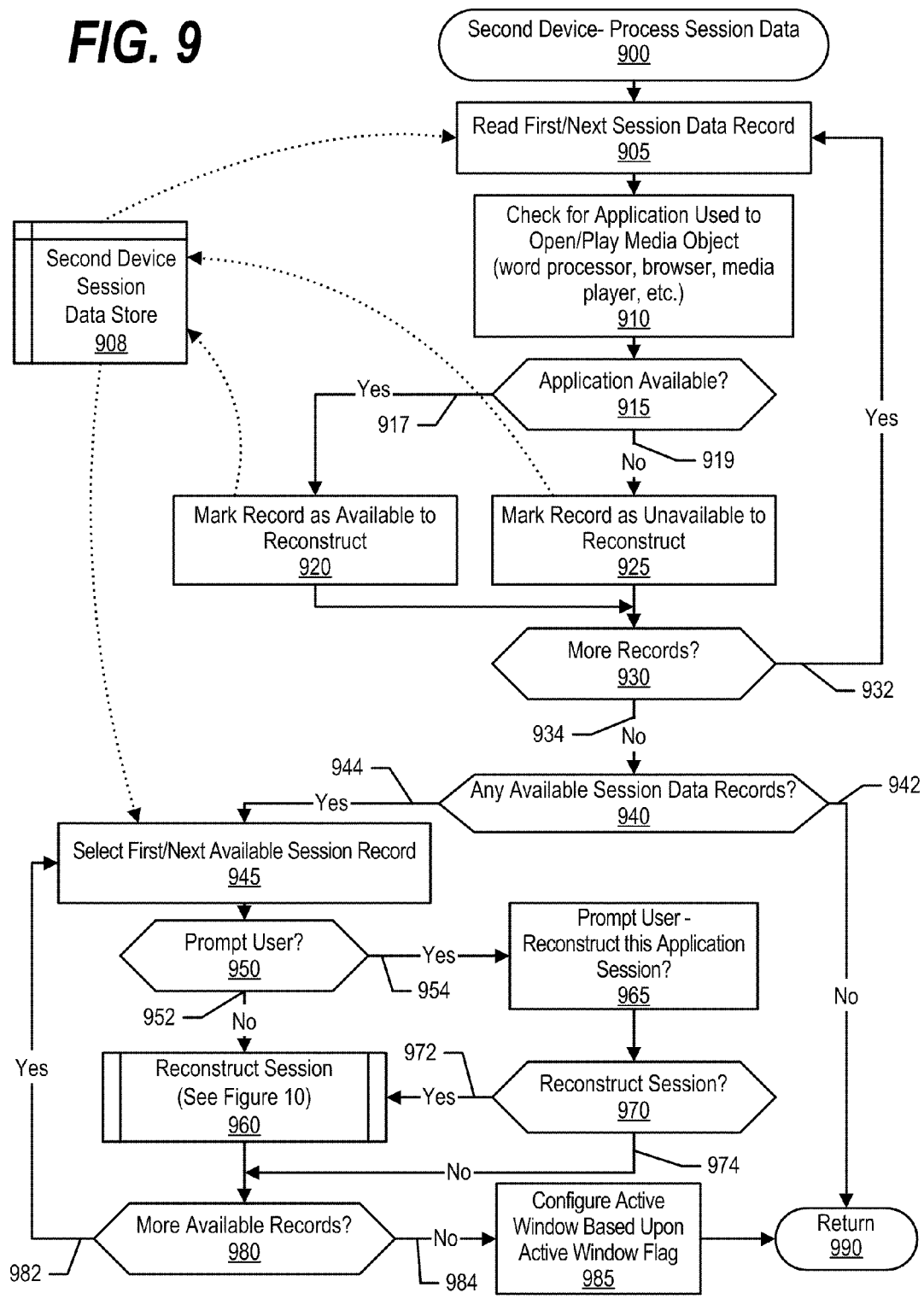
FIG. 9 is a flowchart showing steps taken in processing session data at a second device.

FIG. 9 is a flowchart showing steps taken in processing session data at a second device. A second device uses the session data to reconstruct application sessions at particular media session positions, such as a song's playback position or a scroll position on a document. Processing commences at 900, whereupon the second device reads the first session data record that is stored in second device session data store 908 (step 905). The second device checks for an application that may process a media object type that corresponds to the session data (step 910). For example, the session data may correspond to an audio file, in which case the second device identifies an audio player to reconstruct the application session corresponding to the session data.

The second device determines whether an application is available to process the media object type (decision 915). For example, the session data may correspond to an application that the second device does not have installed. In one embodiment, the first device may send only session data that the second device supports (see FIG. 8 and corresponding text for further details).

If the second device identifies an application that corresponds to the media object type, decision 915 branches to "Yes" branch 917 whereupon the second device marks the session data record as available to reconstruct at step 920. On the other hand, if the second device did not locate an application to support the media object type, decision 915 branches to "No" branch 919 whereupon the second device marks the session data record as unavailable to reconstruct.

A determination is made as to whether there are more session data records in which to analyze (decision 930). If there are more session data records in which to analyze, decision 930 branches to "Yes" branch 932, which loops back to read and process the next session data record. This looping continues until there are no more session data records in which to analyze, at which point decision 930 branches to "No" branch 934.

After analyzing the session data records, the second device determines whether there are any session data records available to reconstruct (decision 940). If there are no session data records available to reconstruct, decision 940 branches to "No" branch 942 whereupon processing returns at 990.

On the other hand, if there are session data records available to reconstruct, decision 940 branches to "Yes" branch 944, whereupon the second device selects the first available session data record at step 945. A determination is made as to whether to prompt the user of the second device to reconstruct the application session (decision 950). For example, the user of the second device may set a default feature that prompts the user each time the second device receives session data from the first device. If the second device should not prompt the user, decision 950 branches to "No" branch 952 whereupon the second device uses the session data to reconstruct the application session (pre-defined process block 960, see FIG. 10 and corresponding text for further details).

On the other hand, if the second device should prompt the user, decision 950 branches to "Yes" branch 954, whereupon the second device prompts the user as to whether the second device should reconstruct the application session (step 965). For example, the second device may be playing a song and receive session data from the first device that corresponds to a different song. In this example, the second device may prompt the user as to whether the user wishes to load the different song and start playing the different song at a playback location (media session position) that is included in the session data.

The second device receives input from the user and determines whether to reconstruct the application session (decision 970). If the second device should reconstruct the application session, decision 970 branches to "Yes" branch 972 whereupon the second device uses the session data to reconstruct the application session (pre-defined process block 960, see FIG. 10 and corresponding text for further details). On the other hand, if the user does not want the second device to reconstruct the session data, decision 970 branches to "No" branch 974 whereupon processing bypasses step 960.

The second device determines whether there are more session data records available in which to process (decision 980). If there are more available session data records to process, decision 980 branches to "Yes" branch 982, whereupon processing loops back to select and process the next available session data record. This looping continues until there are no more available session data records in which to process, at which point decision 980 branches to "No" branch 984.

At step 985, the second device identifies an active user interface window flag included in the session data that corresponds to one of the reconstructed application sessions. When the first device was capturing session data, the first device identified, from various application sessions, the active user interface window, such as a currently focused window in a window manager (see FIG. 8 and corresponding text for further details). If an active user interface window flag exists, the second device identifies the corresponding reconstructed application session and specifies it as the active user interface window at the second device. Processing returns at 990.

Figure 10:
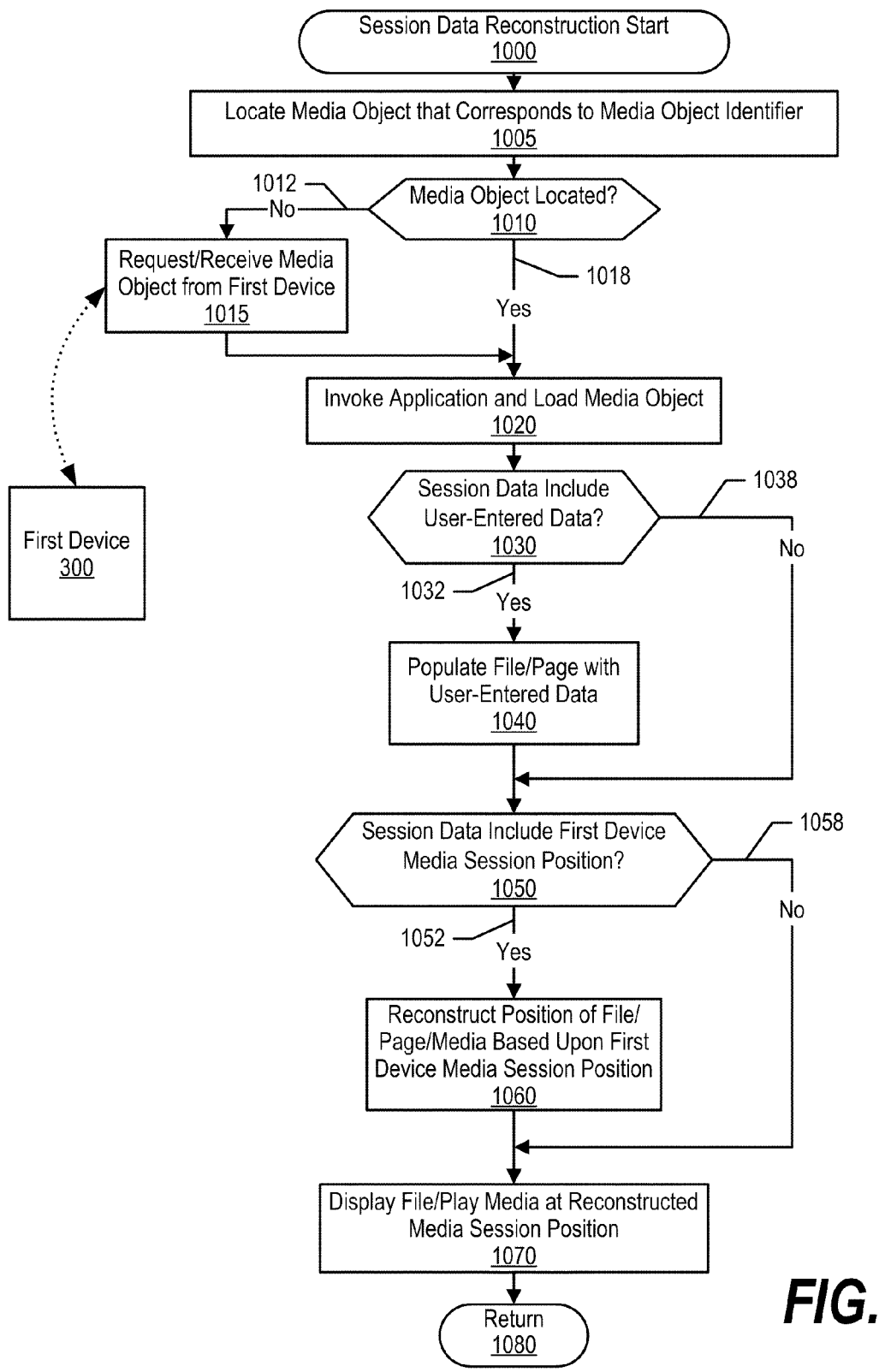
FIG. 10 is a flowchart showing steps taken in utilizing received session data to reconstruct application sessions at a second device.

FIG. 10 is a flowchart showing steps taken in utilizing received session data to reconstruct application sessions at a second device. In FIG. 9, the second device analyzed session data records and associated particular applications to the session data based upon the session data's media object type, such as an audio file, a document, a spreadsheet, etcetera. The exemplary steps shown in FIG. 10 utilize the associated application and the session data to reconstruct an application session.

Processing commences at 1000, whereupon the second device uses the media object identifier (included in the session data) to locate the media object. For example, the media object identifier may be a URL, in which case the second device uses the URL to access a web page. In another example, the media object locator may be a file name, in which case the second device locates the file. A determination is made as to whether the second device located the media object, such as in a file location (decision 1010). If the second device did not locate the media object, decision 1010 branches to "No" branch 1012 whereupon the second device pings first device 300 and receives the media object (step 1015). On the other hand, if the second device located the media object, decision 1010 branches to "Yes" branch 1018.

At step 1020, the second device invokes the application and loads the media object into the application. The second device determines whether the session data includes user-entered data (decision 1030). For example, a user may be entering information into a web page form on a first device, and wish to finish the form on the second device. In this example, the first device captures the user entered information (name, address, and etcetera) and includes the user-entered information in the session data that is sent to the second device.

If the session data includes user-entered data, decision 1030 branches to "Yes" branch 1032 whereupon the second device populates the media object with user-entered data at step 1040. On the other hand, if the session data does not include user-entered data, decision 1030 branches to "No" branch 1038, bypassing step 1040.

The second device determines whether the session data includes a first device media session position, such as a playback position, scroll position, or cursor position (decision 1050). If the session data includes a first device media session position, decision 1050 branches to "Yes" branch 1052, whereupon the second device positions the reconstructed application session at a corresponding second device media session position (step 1060). For example, if the first device is playing a song and the song has been playing for two minutes when the first device captures session data, the second device positions the starting playback position of the song at two minutes into the song. The second device displays/plays the media object at the second device media session position at step 1070 and returns at 1080.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
   receiving captured session data generated by a first device at a second device, the captured session data including one or more session data records that each correspond to one or more application sessions executing on the first device, the captured session data being established in response to a triggering event at the first device, the triggering event being a change in the power state of the first device;

selecting, at the second device, at least one of the session data records and extracting data from the selected session data record; and reconstructing, at the second device, at least one of the application sessions that corresponds to the at least one selected session data record using the extracted data.

2. The method of claim 1 wherein the session data includes audio control values generated at the first device, and the method further comprises:

configuring audio control levels at the second device based upon the audio control values included in the session data.

3. The method of claim 1, wherein the change of the power state is entering a system suspend mode.

4. The method of claim 1, wherein the reconstructing of the application session at the second device includes presenting the application session on the second device at a scroll position corresponding to the scroll position of the application session on the first device when the captured session data was generated.

5. The method of claim 4, wherein the scroll position includes a horizontal scroll position and a vertical scroll position.

6. The method of claim 1, wherein the reconstructing of the application session at the second device includes presenting a cursor on the application session on the second device at a position corresponding to the position of a cursor on the application session on the first device when the captured session data was generated.

7. The method of claim 1, wherein the captured session data includes session data records for at least two application sessions, one of the application sessions being the active window on the first device when the session data is generated but both application sessions being currently running on the first device when the session data is generated, the reconstructing of the application sessions at the second device including presenting the active window of the first device as the active window on the second device.

8. The method of claim 1, wherein the captured session data that is received includes data only for applications executable by the second device as determined by the first device.

9. A first device, comprising:
a processor;
a display accessible to the processor; and
storage accessible to the processor and bearing instructions executable by the processor to:
receive, at the first device, captured session data generated by a second device, the captured session data comprising one or more session data records that each correspond to one or more application sessions executing on the second device, the captured session data being established in response to a triggering event at the second device, the triggering event being a change in the power state of the second device;
select, at the first device, at least one of the session data records and extracting data from the selected session data record; and
reconstruct, at the first device, at least one of the application sessions that corresponds to the at least one selected session data record using the extracted data.

10. The first device of claim 9 wherein the session data comprises audio control values generated at the second device, and the instructions are executable to:
configure audio control levels at the first device based upon the audio control values included in the session data.

11. The first device of claim 9, wherein the change of the power state is entering a system suspend mode.

12. The first device of claim 9, wherein the reconstructing of the application session at the first device comprises presenting the application session on the first device at a scroll position corresponding to the scroll position of the application session on the second device when the captured session data was generated.

13. The first device of claim 12, wherein the scroll position comprises a horizontal scroll position and a vertical scroll position.

14. The first device of claim 9, wherein the reconstructing of the application session at the first device comprises presenting a cursor on the application session on the first device at a position corresponding to the position of a cursor on the application session on the second device when the captured session data was generated.

15. The first device of claim 9, wherein the captured session data comprises session data records for at least two application sessions, one of the application sessions being the active window on the second device when the session data is generated but both application sessions being currently running on the second device when the session data is generated, the reconstructing of the application sessions at the first device comprising presenting the active window of the second device as the active window on the first device.

16. The first device of claim 9, wherein the captured session data that is received comprises data only for applications executable by the first device as determined by the second device.

17. A computer readable storage medium (CRSM) that is not a transitory signal, the computer readable storage medium comprising instructions executable by a processor to:
receive, at a first device, captured session data generated by a second device, the captured session data comprising one or more session data records that each correspond to one or more application sessions executing on the second device, the captured session data being established in response to a triggering event at the second device, the triggering event being a change in the power state of the second device;
select, at the first device, at least one of the session data records and extracting data from the selected session data record; and
reconstruct, at the first device, at least one of the application sessions that corresponds to the at least one selected session data record using the extracted data.

18. The CRSM of claim 17 wherein the session data comprises audio control values generated at the second device, and the instructions are executable to:
configure audio control levels at the first device based upon the audio control values included in the session data.

19. The CRSM of claim 17, wherein the change of the power state is entering a system suspend mode.

20. The CRSM of claim 17, wherein the reconstructing of the application session at the first device comprises presenting the application session on the first device at a scroll position corresponding to the scroll position of the application session on the second device when the captured session data was generated.

21. The CRSM of claim 20, wherein the scroll position comprises a horizontal scroll position and a vertical scroll position.

22. The CRSM of claim 17, wherein the reconstructing of the application session at the first device comprises presenting a cursor on the application session on the first device at a position corresponding to the position of a cursor on the application session on the second device when the captured session data was generated.

23. The CRSM of claim 17, wherein the captured session data comprises session data records for at least two application sessions, one of the application sessions being the active window on the second device when the session data is generated but both application sessions being currently running on the second device when the session data is generated, the reconstructing of the application sessions at the first device comprising presenting the active window of the second device as the active window on the first device.

24. The CRSM of claim 17, wherein the captured session data that is received comprises data only for applications executable by the first device as determined by the second device.

* * * * *